July 18, 1961  H. W. BUUS ET AL  2,992,736
MAGNETIC SEPARATOR
Filed Oct. 27, 1958  2 Sheets-Sheet 1

Inventors
Harold W. Buus
Frank S. Greenwald
by Hill, Sherman, Meroni, Gross & Simpson Attys July 18, 1961 H. W. BUUS ET AL 2,992,736
MAGNETIC SEPARATOR
Filed Oct. 27, 1958 2 Sheets-Sheet 2
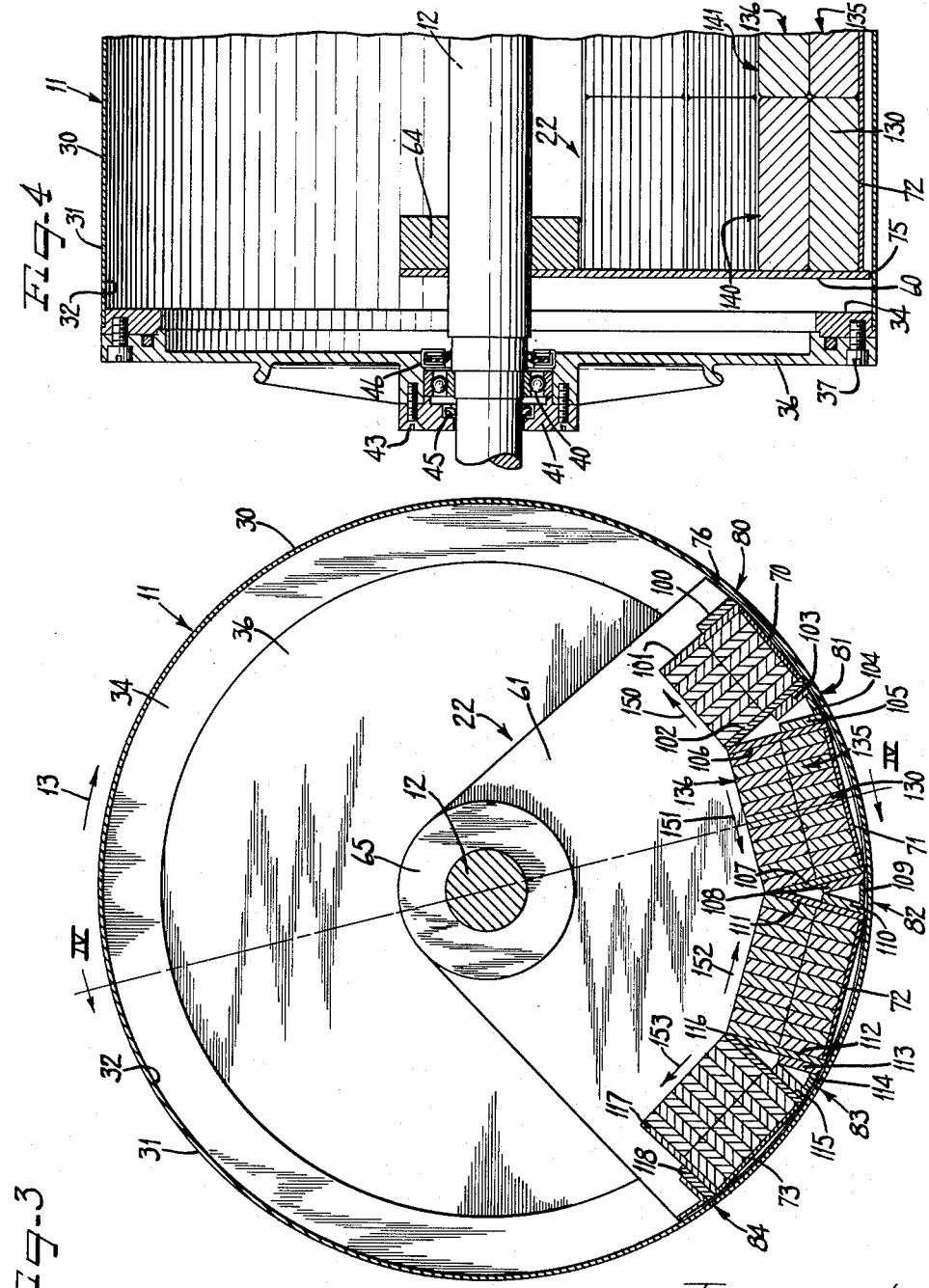
Inventors
Harold W. Buus
Frank S. Greenwald United States Patent Office 2,992,736
Patented July 18, 1961

2,992,736
MAGNETIC SEPARATOR
Harold W. Buus, Hales Corners, and Frank S. Greenwald, Wauwatosa, Wis., assignors to Indiana General Corporation, a corporation of Indiana
Filed Oct. 27, 1958, Ser. No. 769,856
12 Claims. (Cl. 209—223)

This invention relates to a magnetic separator and particularly to a magnetic separator for beneficiating magnetic ores.

In one embodiment of the present invention permanent magnets in the form of a multiplicity of wafer-shaped slabs are stacked between successive magnetic pole pieces in close proximity to the interior surface of a drum type separator. It is found that placing the permanent magnets substantially as close as possible to the periphery of the drum provides optimum efficiency and a consequent marked reduction in the cost of permanent magnet material required for a given application. It has been found that the present invention permits a saving of approximately 50% of the cost of the permanent magnetic material used in prior constructions.

An important object of the present invention is to provide a magnetic separator utilizing permanent magnet material in a novel and highly efficient manner to radically reduce the required amount of permanent magnet material in a given separator construction.

Another important object of the invention is to provide a permanent magnet type magnetic separator for beneficiating ores having greatly reduced leakage flux and providing a given useful magnetic field strength at greatly reduced cost.

A further object of the invention resides in the provision of a magnetic separator having permanent magnet units of standard size wherein the depth of magnetic field may be increased or decreased by changing the number of permanent magnet units between the poles of the separator.

Still another object is to provide a magnetic separator having standardized permanent magnet units which are adaptable to separator drums of different diameter and which may be used to increase the extent of the magnetic field about the drum periphery by adding additional stacks of said permanent magnet units.

Other objects, features and advantages of the present invention will be apparent from the following detailed description taken in connection with the accompanying drawings, in which:

FIGURE 3 is a vertical cross sectional view showing the magnetic separator drum and permanent magnet assembly of FIGURE 1;

FIGURE 4 is a fragmentary longitudinal sectional view taken along the line IV—IV of FIGURE 3.

FIGURE 1 illustrates a drum-type magnetic separator which has been designed specifically for magnetic media recovery in heavy density separation systems. The system may be utilized for highly efficient recovery of magnetite media in coal heavy density plants, and ferrosilicon in ore cleaning heavy density plants with single unit operation.

Figures 1, 2, 5:
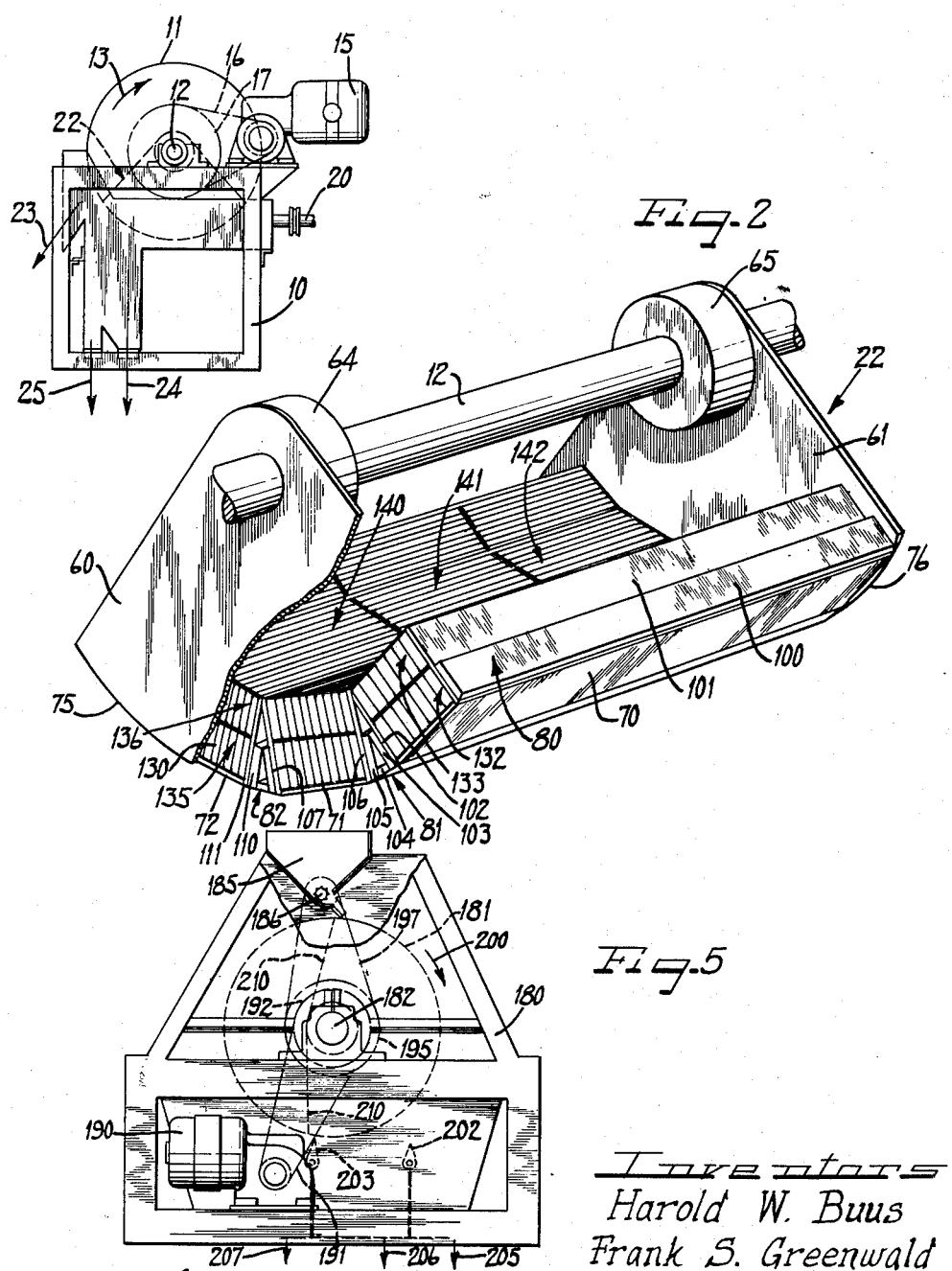
FIGURE 1 is a diagrammatic illustration of a wet type magnetic drum separator embodying the principles and teachings of the present invention.
FIGURE 2 is a perspective view with a portion broken away and in section illustrating the permanent magnet assembly of the separator of FIGURE 1.
FIGURE 5 is a diagrammatic illustration of a dry type magnetic separator embodying the principles and teachings of the present invention.

The magnetic separator comprises generally a framework 10 having a drum 11 mounted thereon by means of a longitudinal shaft 12. The drum 11 may be driven in the direction of the arrow 13 by means of a motor-reducer drive indicated generally at 15, a sprocket chain 16 and a sprocket wheel 17 fixed to the drum 11 and freely rotatable relative to shaft 12.

The slurry feed is introduced to the separator by means of piping such as indicated at 20 and through a rectangular opening into a distribution chamber from which it flows under the submerged portion of the drum 11. The magnetic solids are attracted to the rotating drum surface by means of an arrangement of permanent magnets indicated diagrammatically at 22 and carried through a series of alternating polarity magnetic fields associated with the permanent magnets to final magnetic discharge as indicated by the arrow 23. The non-magnetic solids with the bulk of the water are carried to the tailing discharge indicated by arrow 24. An operating water level is maintained in the separation zone, with the excess water being carried off through the overflow discharge indicated by arrow 25.

The illustrated magnetic separator has the objective of obtaining maximum possible magnetic recoveries at high volume capacities. In heavy media applications the magnetic separator feed is normally quite dilute, and the capacity limits of the separator are therefore measured in volume of slurry. The desired capacity is the maximum volume of slurry feed at which economical magnetic recoveries are obtained. Experience has indicated a slurry feed rate of 8 gallons per minute per inch of magnet width axially of the drum as a good average for selection of separator size. For example, a drum of 30 inch diameter and a magnet width of 45 inches could be rated at about 360 gallons per minute for selection purposes. The usual operating recovery requirements are that heavy media loss be held to less than ½ pound per each ton of plant feed. The separator is able to discharge a magnetic concentrate of high specific gravity to permit plant operation without a densifier. The specific gravity of magnetite media concentrates will usually be from 2.15 to 2.4, enabling direct return of the media to the sump or vessel in either bituminous or anthracite coal heavy density plants. On ferrosilicon media the specific gravity of the concentrates will normally range from 2.65 to 2.75.

FIGURE 4 illustrates the details of the manner in which the drum 11 is mounted on the shaft 12. The drum comprises a cylindrical shell or material conveyor 30 having an exterior surface 31 for receiving and conveying magnetic material and an interior surface 32. The shell 30 is secured to annular rings 34 which in turn have end plates 36 secured thereto by means of screws such as 37. The end plates 36 are journalled on the shaft 12 by means of bearings such as indicated at 40 which are retained on the shaft by means of caps such as 41 secured to the plates 36 by means of screws such as indicated at 43. Suitable seals such as indicated at 45 and 46 may be provided for protecting the bearings. It will be understood that a sprocket wheel such as indicated diagrammatically at 17 in FIGURE 1 is secured to one of the end plates 36 in FIGURE 4 for rotating the drum 11 on the fixed shaft 12. The drum 11 may be of non-magnetic material, and for example the shell 30 may be of stainless steel.

The fixed permanent magnet assembly designed generally by the reference numeral 22 is FIGURE 1 may comprise support plates 60 and 61 of non-magnetic material secured by means of hubs 64 and 65 in fixed relation on the shaft 12 as seen in FIGURE 2. For example, the hubs 64 and 65 may be welded to the support plates 60 and 61 and to the shaft 12. Suitable means may be provided externally of the drum 11 for adjusting the angular position of the shaft 12 to adjust the angular position of the magnet assembly relative to the periphery of the drum. In operation of the separator, the shaft 12 is fixed in a predetermined angular position to maintain a predetermined fixed position of the magnet assembly such as illustrated in FIGURE 1 at 22.

Extending between the support plates 60 and 61 and secured thereto are a series of flat holding plates of non-magnetic material 70, 71, 72 and 73. Lower margins 75 and 76 of the support plates 60 and 61 are of arcuate configuration and define segments of a circular arc about the axis of shaft 12 so as to be concentric with the interior surface 32 of the shell 30 and spaced from the interior surface 32 substantially only the distance necessary to provide a clearance gap accommodating rotation of the shell 30 relative to the magnet assembly. It will be observed in FIGURE 2 that the holding plates such as 70 define chords of the circular arcs defined by the margins 75 and 76, so that the holding plates 70–73 are substantially as close as possible to the interior surface 32 of the shell 30.

Also extending between the support plates 60 and 61 and secured thereto are a series of magnetic pole pieces 80, 81, 82, 83 and 84 illustrated as being formed of strips 100–118 of magnetic material. It will be observed from FIGURE 3 that the inner pole pieces 81, 82 and 83 are of generally a triangular configuration as seen in cross section. These pole pieces may be formed of a single solid wedge-shaped piece of magnetic steel if desired. By forming the pole pieces of plates or strips such as 102, 103, 104, 105 and 106 which are welded into the triangular configuration, a reduction in the overall weight is achieved and the amount of machining required to form the poles is reduced. Tests have shown that the welded plate type pole piece as shown in FIGURE 3 has sufficient cross sectional area to carry the total flux introduced into these poles by the permanent magnets. It will be observed that the lower margins of the pole pieces are substantially as close to the inner peripheral surface 32 of the shell 30 as possible while still providing the necessary clearance gap as with the holding plates 70–73.

As illustrated, the permanent magnet assemblies are provided by stacks of permanent magnet units such as indicated at 130 of standardized dimensions. In the illustrated embodiment, the permanent magnets are arranged in two layers such as indicated at 132 and 133 and at 135 and 136 in FIGURE 2. The layers such as 135 and 136 between pole pieces 82 and 83 may be comprise successive rows of stacks such as indicated at 140, 141 and 142 in FIGURE 2.

It will be observed that the pole piece strips 101, 102, 106, 107, 111, 112, 116 and 117 are of lengths equal to the total length between the support plates 60 and 61 over which the permanent magnets extend, and are equal in height to the combined height of the two layers such as 132 and 133 (FIGURE 2) of the permanent magnet stacks. The lower pole piece strips 100, 103, 105, 108, 110, 113, 115 and 118 are of the same length as strips such as 101, but of a height approximating the height of the first layer of stacks such as 132 (FIGURE 2). In the illustrated embodiments each of the permanent magnet units 130 of a given stack are magnetized in the same direction through the thickness dimension of the permanent magnet slabs so as to provide directions of magnetization as indicated by arrows 150, 151, 152 and 153 in FIGURE 2. With these directions of magnetization, pole pieces 80, 82 and 84 may be considered of north magnetic polarity, while pole pieces 81 and 83 may be considered to be of south magnetic polarity. In the illustrated embodiment, all of the permanent magnet units between a given set of pole pieces are magnetized in the same direction to give a magnetic field of the same polarity along the length of the drum at the exterior surface 31 of the shell. Material carried along by the exterior surface 31 during rotation of the drum thus experiences successively a north pole at 80, a south pole at 81, a north pole at 82, a south pole at 83 and a north pole at 84, after which of course the magnetic material is no longer attracted to the drum surface and is discharged as indicated by the arrow 23 in FIGURE 1.

It is found highly advantageous to utilize ceramic permanent magnets for the units 130 as known by the trademark "Indox V." The utilization of permanent magnet materials for the energization source of the magnet assembly is, of course, a distinctive advantage as compared to electro-magnetic energization, since no external source of electrical energy is required. The utilization of "Indox V" ceramic permanent magnets provides an improved energy source, enabling utilization of the total magnetic energy much more efficiently than prior art structures. The "Indox V" ceramic permanent magnet units can be suitably made into one specific standard shape enabling the use of multiple numbers of this one shape in various arrangements to efficiently construct magnetic separators of different widths, of different diameter and of different magnetic intensities and field distributions.

By the illustrated construction, it will be observed that the permanent magnets are substantially as close to the useful gap between the pole pieces as possible, which is believed to explain the reduced leakage and consequent optimum efficiency of the present construction. The construction illustrated herein is found to permit a saving of approximately ½ of the cost of the permanent magnet material. By increasing the number of permanent magnet units in each stack, the spacing between poles is increased to provide a field which is effective at a greater distance from the drum external surface.

FIGURE 5 illustrates a second embodiment of the present invention which is generally similar to the preceding embodiment but involves a dry process for concentrating magnetic materials. This separator is especially intended for the separation and concentration of magnetic iron ores.

In the embodiment of FIGURE 5, a framework 180 supports a drum indicated at 181 by means of a fixed shaft 182 in the same manner as illustrated in FIGURES 1 through 4. Material to be separated in a dry form is delivered to a hopper 185 having suitable feed means such as indicated at 186 for delivering material at a uniform rate to the surface of the non-magnetic drum shell corresponding to the shell 30 in FIGURES 3 and 4. The drum is rotated by means of a motor-reducer drive 190, sprocket chain 191 and sprocket 192 in the same manner as in FIGURE 1, the sprocket 192 being fixed to the drum 181 for rotation therewith relative to the fixed shaft 182. A second sprocket wheel 195 may be fixed to rotate with drum 181 and may drive feed means 186 by means including a sprocket chain 197. In place of the star-type feeder indicated at 186, a separate vibrating conveyor type feed may deliver material to the hopper 185 at a relatively uniform rate, in which case the star feeder 186 would be omitted.

The drum 181 may rotate in the direction indicated by the arrow 200, and the separator may be provided with adjustable division vanes such as diagrammatically indicated at 202 and 203 for separating the material falling from the surface of the drum 181 into three discharging streams as indicated by arrows 205, 206 and 207.

The permanent magnet assembly is indicated by the dash lines designated by the reference numeral 210 and it will be observed that this assembly extends over somewhat more than 180° of the periphery of the drum 181. The permanent magnet assembly is essentially the same as that illustrated in FIGURE 2, except that additional stacks of permanent magnet units 130 and additional triangular pole pieces are provided to increase the peripheral extent of the permanent magnet assembly as indicated at 210 in FIGURE 5. As illustrated in FIGURES 2 and 3, the magnetic poles are of the same polarity and are uniform in strength across the entire drum width.

In operation, material is fed to the separator by the feeder 186 which, for example, may operate for material ranging from fines to ½ inch in size. The feeder accurately controls the rate of feed and provides equal distribution across the entire drum width. Where coarser material is to be concentrated, a separate vibrating-type feeder is recommended.

The feed falls on the revolving drum at the first magnet pole and as it does receives a definite magnetic polarity. The second magnet pole has a reverse polarity from the first, and as the material passes it on the drum in the direction of the arrow 200, the magnetically responsive fraction of the feed tends to shift and reorient itself. This agitation and reorientation releases some of the entrapped non-magnetic material and permits it to fall free to the right of the vane 202 as seen in FIGURE 5 as a tailings discharge as indicated by the arrow 205. The process is then repeated for the third and succeeding magnet poles, and each provides a further magnetic material movement and cleaning. The result is an exceptionally clean magnetic product coming from the concentrate zone to the left of the vane 203 as indicated by the arrow 207 in FIGURE 5.

The material which does not discharge as tailings and yet is not sufficiently magnetic to concentrate may be independently obtained in the middling zone between the vanes 202 and 203 as indicated by the middling discharge arrow 206. In ore processing operations, middlings are usually recrushed and returned to the separator to provide maximum recoveries.

As in the embodiment of FIGURES 1 to 4, the permanent magnet assembly comprises stacks of permanent magnets preferably of ("Index V") ceramic material arranged in layers and rows between triangular pole pieces, all as illustrated in FIGURE 2, for example. As in the embodiment of FIGURES 1 to 4, the permanent magnets are substantially as close to the useful gap between the pole pieces as possible, and the number of standard size permanent magnet units in each stack or magnet between successive pole pieces may be varied to adjust the depth of the magnetic field extending from the surface of the drum 181.

The permanent magnet units of the present invention preferably are of a non-metallic material composed principally of a composite oxide of iron and at least one of the metals selected from the group consisting of barium, strontium and lead. Specifically a material having the formula $BaO \cdot 6Fe_2O_3$ is preferable for present commercial applications.

It will be apparent that many other modifications and variations may be effected without departing from the scope of the novel concepts of the present invention.

We claim as our invention:

1. A magnetic separator comprising a hollow drum of non-magnetic material having an exterior surface for conveying material to be separated and an interior surface, means mounting said drum for rotation on its longitudinal axis, and a stationary permanent magnet assembly mounted in said drum in close relation to said interior surface for establishing a magnetic field at said exterior surface operative to tend to hold magnetic material on said exterior surface to separate the same from non-magnetic material, said assembly comprising a stack of permanent magnet units disposed adjacent said interior surface and a pair of pole pieces engaging opposite ends of said stack and disposed in close relation to said interior surface, said permanent magnet units comprising slabs of rectangular configuration with a length dimension extending parallel to said longitudinal axis and a thickness dimension extending generally circumferentially of said drum, said slabs being magnetized in a direction through their thickness dimension and the slabs of each stack being magnetized in the same direction.

2. A magnetic separator comprising a hollow drum of non-magnetic material having an exterior surface for conveying material to be separated and an interior surface, means mounting said drum for rotation on its longitudinal axis, and a stationary permanent magnet assembly mounted in said drum in close relation to said interior surface for establishing a magnetic field at said exterior surface operative to tend to hold magnetic material on said exterior surface to separate the same from non-magnetic material, said assembly comprising a stack of permanent magnet units disposed adjacent said interior surface and a pair of pole pieces engaging opposite ends of said stack and disposed in close relation to said interior surface, the units of said stack and said pole pieces having edges adjacent said interior surface which lie substantially in a chordal plane of said interior surface, each magnet unit being magnetized in a direction substantially parallel to said chordal plane.

3. In a magnetic separator comprising a conveyor with a material receiving surface for conveying material to be separated and a permanent magnet assembly for tending to attract magnetic material to be separated toward the material receiving surface for movement therewith, the improvement characterized by said assembly comprising a series of magnets arranged at successive angles along said conveyor, and pole pieces disposed between successive magnets and at the outer ends of the end magnets of said series, the magnets being magnetized generally parallel to the path of the conveyor.

4. In a magnetic separator comprising a conveyor with a material receiving surface for conveying material to be separated and a permanent magnet assembly for tending to attract magnetic material to be separated toward the material receiving surface for movement therewith, the improvement characterized by said assembly comprising a series of magnets arranged at successive angles along said conveyor, the axes of the successive magnets defining chords of a circular arc and the magnets being magnetized in a direction substantially parallel to their respective axes.

5. In a magnetic separator comprising a conveyor with a material receiving surface for conveying material to be separated and a permanent magnet assembly for tending to attract magnetic material to be separated toward the material receiving surface for movement therewith, the improvement characterized by said assembly comprising a series of magnets arranged at successive angles along said conveyor, and pole pieces disposed between successive magnets and at the outer ends of the end magnets of said series, said pole pieces being of triangular cross section with angularly related surfaces engaging adjacent magnets and with a third surface in close relation to said conveyor, the magnets being magnetized in a direction substantially at right angles to the respective surfaces engaged thereby, 6. In a magnetic separator comprising a conveyor with a material receiving surface for conveying material to be separated and a permanent magnet assembly for tending to attract magnetic material to be separated toward the material receiving surface for movement therewith, the improvement characterized by said assembly comprising a series of magnets arranged at successive angles along said conveyor, and pole pieces being of triangular cross section with angularly related surfaces engaging adjacent magnets and with a third surface in close relation to said conveyor and being formed of magnetic strip material, the magnets being magnetized in a direction substantially at right angles to the respective surfaces engaged thereby.

7. In a magnetic separator comprising a conveyor with a material receiving surface for conveying material to be separated, a stationary permanent magnet assembly mounted adjacent said conveyor for tending to attract material to be separated toward said material receiving surface for movement therewith, said assembly comprising a group of permanent magnet units extending in close proximity to said conveyor, and magnetic pole pieces at opposite ends of said group of permanent magnet units and extending into close proximity to said conveyor, said permanent magnet units comprising slabs of ceramic permanent magnet material of greater length and width than thickness and magnetized through the thickness dimension, the slabs being stacked along an axis through the thickness dimensions of the slabs and being magnetized in the same direction along said axis.

8. In a magnetic separator comprising a conveyor with a material receiving surface for conveying material to be separated, a stationary permanent magnet assembly mounted adjacent said conveyor for tending to attract material to be separated toward said material receiving surface for movement therewith, said assembly comprising a group of permanent magnet units extending in close proximity to said conveyor, and magnetic pole pieces at opposite ends of said group of permanent magnet units and extending into close proximity to said conveyor, said permanent magnet units comprising slabs of uniform configuration having planar surfaces in flatwise engagement with each other and being magnetized in a direction substantially at right angles to said planar surfaces.

9. In a magnetic separator including a conveyor movable along a curved path and having a surface for receiving material to be separated and a permanent magnet assembly located at the inner side of said curved path for tending to attract magnetic material against said surface of said conveyor to separate the same from non-magnetic material, the improvement characterized by a series of permanent magnet units extending along chords of said curved path, said permanent magnet units being of identical configuration and having opposite planar surfaces, and pole pieces having flat angularly related surfaces for engaging flatwise with the planar surfaces of the permanent magnet units, the units being magnetized substantially parallel to said chords and at substantially right angles to said planar surfaces of the permanent magnet units.

10. In a magnetic separator including a conveyor movable along a curved path and having a surface for receiving material to be separated and a permanent magnet assembly located at the inner side of said curved path for tending to attract magnetic material against said surface of said conveyor to separate the same from non-magnetic material, the improvement characterized by a series of permanent magnet units extending along chords of said curved path, said permanent magnet units being of identical configuration and having opposite planar surfaces, said permanent magnet units comprising slabs of ceramic permanent magnet material magnetized through a thickness dimension thereof, the slabs defining each of said chords of said curved path being magnetized substantially parallel to the respective chords and having the same direction of magnetization.

11. A permanent magnet assembly for a magnetic separator comprising a series of angularly related stacks of permanent magnet units having pole pieces of triangular configuration disposed between adjacent stacks and engaging flatwise therewith, and means for mounting said series of stacks and pole pieces for assembly in a magnetic separator, the units of each stack being magnetized in the same direction along the axis of the stack.

12. A magnetic separator comprising a hollow drum of non-magnetic material having an exterior surface for conveying material to be separated and an interior surface, means mounting said drum for rotation on its longitudinal axis, and a stationary permanent magnet assembly mounted in said drum in close relation to said interior surface for establishing a magnetic field at said exterior surface operative to tend to hold magnetic material on said exterior surface to separate the same from non-magnetic material, said assembly comprising a series of pole pieces spaced along said interior surface in the circumferential direction and a stack of permanent magnet units disposed between each successive pair of pole pieces of said series, each of said magnet units being magnetized in a direction generally parallel to the circumferential direction of said drum and the magnet units of each stack being magnetized in the same direction.

References Cited in the file of this patent

FOREIGN PATENTS

| | | |
|---|---|---|
| 461,816 | Great Britain | Feb. 25, 1937 |
| 563,022 | Geat Britain | July 26, 1944 |
| 810,861 | Germany | Aug. 13, 1951 |